United States Patent [19]

Hunting

[11] Patent Number: 4,708,377
[45] Date of Patent: Nov. 24, 1987

[54] CONTRACTIBLE COUPLING

[75] Inventor: Ronald M. Hunting, Lawrence, Kans.

[73] Assignee: Aeroquip Corporation, Jackson, Mich.

[21] Appl. No.: 935,746

[22] Filed: Nov. 28, 1986

[51] Int. Cl.$^4$ ............................................. F16L 23/00
[52] U.S. Cl. .................................... 285/407; 285/420; 24/20 S; 72/379
[58] Field of Search ............... 285/406, 407, 408, 420, 285/364, 365, 244; 24/20 S, 20 R; 72/379

[56] References Cited

U.S. PATENT DOCUMENTS

| | | | |
|---|---|---|---|
| 3,479,069 | 11/1969 | Sedam | 285/364 |
| 3,669,474 | 6/1972 | Bode | 285/408 X |
| 4,305,179 | 12/1981 | Sakurada | 24/23 R X |
| 4,425,682 | 1/1984 | Hashimoto et al. | 24/20 S |

FOREIGN PATENT DOCUMENTS 511690  12/1953  Belgium .............................. 285/408

Primary Examiner—Dave W. Arola
Attorney, Agent, or Firm—Beaman & Beaman

[57] ABSTRACT

A contractible coupling for flared conduit connections of an annular configuration wherein the coupling includes a resilient metal band having tabs at the band ends permitting the band to be opened while contraction is produced by the band resiliency. A plurality of fingers located along the band lateral edges are deformed inwardly in spaced parallel relationship to the band inner surface to provide circumferentially spaced pressure points on the conduit flares being clamped.

11 Claims, 6 Drawing Figures

CONTRACTIBLE COUPLING

BACKGROUND OF THE INVENTION

Contractible couplings or clamps are employed to annularly circumscribe a member to be clamped, such as a conduit, and the purpose of the coupling is to exert a force or pressure on the member being embraced which produces a uniform circumferential force for sealing purposes. While such couplings may employ bolts, worm drives or other contracting components, the couplings may consist of wire or bands formed of resilient material, such as spring steel, wherein the resiliency of the coupling material produces the contracting force for gripping and compressing the member embraced.

Conventional annular couplings or clamps utilizing the resiliency of the coupling material to produce contracting forces are not suitable for installations wherein relatively high temperatures are encountered, such as in exhaust systems for internal combustion engines, in that heating of the coupling material tends to adversely affect the ability of the coupling to maintain effective contraction forces.

It is an object of the invention to provide a contractible coupling or clamp of the resilient type wherein the coupling may be used with flared conduit joints or connections in relatively high temperature applications without being adversely affected by the temperature of the member being embraced.

Another object of the invention is to provide a radially contractible coupling of an annular configuration for use with flared conduit connections wherein contraction is produced by the resiliency of an annular band, and a plurality of fingers defined upon the band engage the conduit flared surfaces and permit circumferentially spaced engagement of the coupling upon the conduits.

A further object of the invention is to provide a contractible coupling utilizing the resiliency of a coupling band to produce the contraction forces wherein the coupling engages the member being embraced at predetermined spaced locations, and the coupling band is in radial spaced relationship to the embraced member.

Yet another object of the invention is to provide a method for forming a contractible coupling of stamped sheet metal having the aforementioned objects and advantages wherein the coupling may be economically fabricated and is of homogeneous one-piece construction.

In the practice of the invention a sheet metal blank, preferably of stainless steel, is formed wherein the blank includes a body of generally rectangular configuration having a longitudinal length, ends and lateral edges. A tab is formed at each end of the body extending from the body ends, and the tabs are located upon opposite sides of the body center line or axis. Each of the tabs includes a flange at an outer lateral tab edge which is later deformed inwardly to reinforce the tab against deflection under bending forces.

A plurality of fingers homogeneously extend from the body lateral edges in spaced relationship to each other. Each of the fingers includes a base portion at which the finger is connected to the body edge, a free end, and an intermediate portion between the base portion and the free end.

After the coupling blank has been stamped the fingers are bent 180° at their base portion whereby the fingers will be located in spaced relationship to the body inner surface and will extend over the body inner surface. The length of the fingers is such that the free ends of the fingers extend "inwardly" a distance less than the center of the body as defined by the body lateral edges, and the portions of the fingers at the free ends are curved to form convex conduit engagable surfaces and the free ends extend toward the body inner surface without engaging the same. The fingers' intermediate portion is approximately parallel to the body inner surface.

The tab flanges are formed inwardly as the adjacent fingers are bent, and as the tab flanges are disposed at substantially 90° to the plane of the tabs, the flanges will support the tabs against bending forces applied perpendicular to the plane of the tabs.

The coupling blank is now formed into an annular configuration wherein the inner diameter of the coupling is defined by the innermost surfaces of the fingers, i.e. the intermediate portion of the fingers. The length of the body is such that the tabs at each body end extend adjacent and "past" each other in a manner generally tangential to the coupling configuration, and the form of the tabs is such that squeezing of the tabs or forcing the tabs toward each other tends to increase the diameter of the annular configuration of the coupling.

After the sheet metal coupling is fully shaped, it is heat treated in order to retain the resiliency desired and resistance to deflection. The blank is formed of a spring steel material, preferably of a stainless steel composition.

The fingers extending from the lateral edges of the coupling body are in alignment with each other with respect to the body width, and accordingly, the aligned fingers, together, will form opposed pressure locations on the flares of the conduits being clamped.

The coupling is used by squeezing the tabs toward each other by an appropriate tool, such as a plier-like implement, and this squeezing of the tabs will open the diameter of the coupling and permit the coupling to be placed upon the flares of the conduits to be clamped. Release of the tabs permits the coupling to contract toward its normal diameter, which will be resisted as the fingers engage the flares of the conduits being embraced.

As only the inwardly curved portions of the free ends of the fingers will engage the flares of the conduits being clamped, a plurality of circumferentially spaced opposed clamping locations are produced on the conduit flares which are substantially evenly distributed throughout the circumference of the conduits. The curved portions of the finger's free ends will engage the flares of the connected conduits in opposed relationship and produce both radial and axial forces on the flares to produce an effective sealed relationship between the conduits at their flares, and the limited resilient nature of the fingers will aid in locating the coupling on the conduit's flares and equalize the forces of the fingers on the flares. As the fingers are radially spaced from the coupling body, the body is in spaced relationship to the conduits being clamped, and heat from the clamped member is not directly transferred to the coupling body. Further, as the coupling body is in spaced relationship to the conduits being clamped, air may circulate therebetween which aids in maintaining the coupling body at a lower temperature.

As the contractible coupling in accord with the invention is formed from a single sheet metal blank, the fabricating techniques are inexpensive and may be accomplished by high production techniques.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 6:
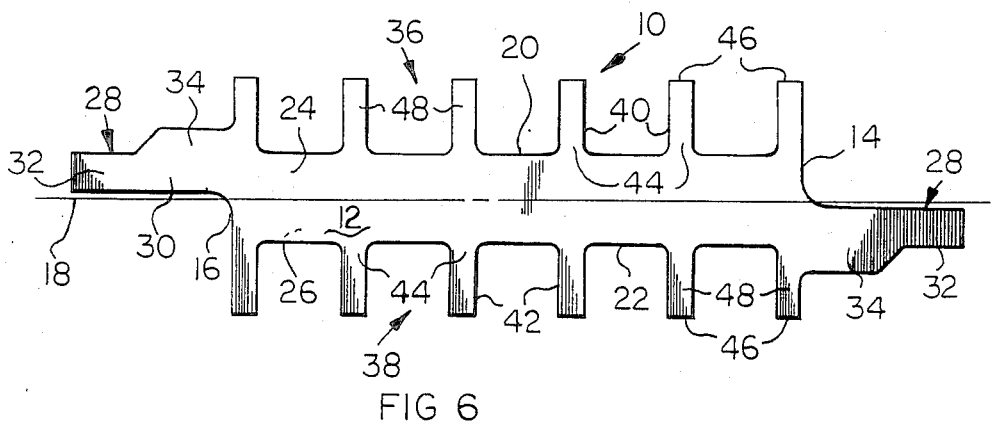
FIG. 6 is a plan view of a sheet metal blank from which the contractible coupling in accord with the invention is formed prior to bending of the fingers and tab flanges, and prior to formation of the coupling into an annular configuration.

The basic configuration of the blank from which a contractible coupling is constructed in accord with the invention is best appreciated from FIG. 6, the illustrated blank 10 being in a planar configuration. Preferably, the blank is formed of a spring steel-type composition such as 17-7 PH stainless steel, and in a commercial embodiment is 0.040 inches thick.

The blank 10 illustrated in FIG. 6 includes a generally rectangular body 12 having ends 14 and 16, a longitudinal axis represented at 18, parallel lateral edges 20 and 22, and opposite planar sides designated an outer surface 24 and an inner surface 26 disposed away from the viewer.

The ends of the body 12 are each provided with an elongated tab 28 having an inner portion 30 and an outer portion 32. The tabs 28 extend in a direction parallel to the body axis 18, but as will be appreciated from FIG. 6, the left tab is on one side of the axis 18, while the right tab is located on the opposite side of the axis. The outer lateral edge of each tab 28 is formed with a flange 34 for a purpose later described.

A set of six fingers is located on each lateral edge of the body 12, set 36 is associated with edge 20 and set 38 extends from edge 22. The elongated fingers 40 comprise set 36, while the elongated fingers 42 comprise set 38, and the fingers are perpendicularly related to their associated body edge, and the fingers of a common set are in equal spaced relationship to each other. As will be noted in FIG. 6, the fingers 36 associated with lateral edge 20 are each in transverse alignment with a finger 42 defined on edge 22, and as will be later apparent, the aligned fingers, together, define a circumferential pressure location for the coupling upon the member being clamped.

The fingers 40 and 42 each include a base portion 44 adjacent the associated body lateral edge, a free end 46, and an intermediate portion 48 located between the base portion 44 and the associated free end 46.

Figure 5:
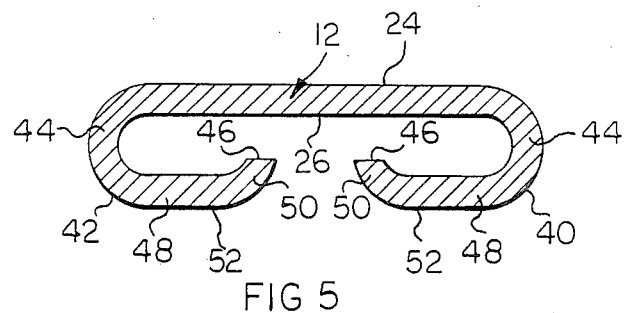
FIG. 5 is an enlarged, detailed, elevational, sectional view through the coupling body and fingers similar to FIG. 3.

After the blank 10 has been formed as shown in FIG. 6, the fingers 40 and 42 are deformed away from the viewer wherein a substantially 180° bend is defined at the fingers' base portion 44 and the fingers extend toward the body axis 18 in spaced relationship to the body 12. This bend is best appreciated from FIG. 5, and this deformation of the fingers locates the intermediate portion 48 in spaced parallel relationship to the body inner surface 26. The free ends 46 of the fingers are deformed inwardly toward the surface 26 to form convex arcuate portions at 50 wherein the fingers will now have the configuration shown in FIG. 5. The length of the fingers 40 and 42 is such that when the fingers are formed each terminates short of the middle of the body 12 as defined by the axis 18. Thus, the convex bends 50 of aligned fingers will be in spaced opposed relationship for receiving the flares of the conduits being clamped therebetween, as described below.

As the fingers 40 and 42 are being deformed relative to the body 12, the flanges 34 are also being deformed in a like direction wherein the flanges will be disposed approximately 90° with respect to the plane of the associated tab portion 30. This deformation of the flanges 34 with respect to the associated tab 28 will reinforce the tab and increase its resistance to bending forces in a direction perpendicular to the tab plane. Also, the outermost end 32 of the tabs 28 is deformed slightly outwardly so that the configuration of the tabs will be as illustrated in FIG. 1.

Figure 1:
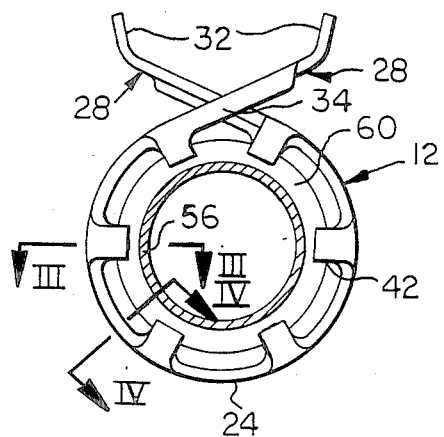
FIG. 1 is an elevational view of a contractible coupling in accord with the invention, the conduits being clamped being shown.
Figure 2:
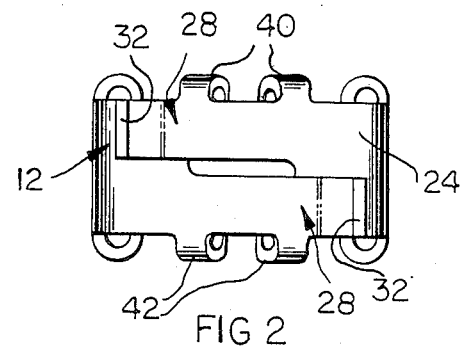
FIG. 2 is a plan view of the coupling as taken from the top of FIG. 1, the clamped conduits not being illustrated.

After the fingers 40 and 42, flanges 34 and tab portions 32 have been shaped as described, the body 12 is formed into an annular band configuration as shown in FIGS. 1 and 2. This annular forming of the body 12 will locate the tabs 28 adjacent each other, FIG. 2, and the length of the tabs with respect to the diameter of the annular coupling configuration is such that the tabs 28 extend past each other in a generally tangential relationship to the body 12. As the tabs 28 are formed on opposite sides of the body axis 18, no interference occurs between the tabs due to the annular shaping of the coupling body.

After the body 12 has been formed into its annular configuration the coupling is heat treated to a temperature sufficient to impart to the stainless steel the desired resistance to elasticity and deformation to provide the desired contracting forces.

The coupling body is formed to an annular configuration wherein the coupling inner diameter is defined by the innermost surfaces 52 of the deformed fingers' intermediate portions and the convex portions 50 of transversely aligned fingers 40 and 42 will be in opposed relationship.

Figure 3:
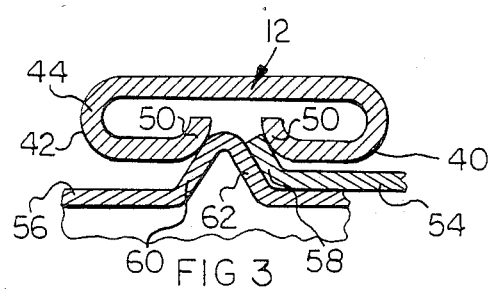
FIG. 3 is an elevational, sectional view as taken along Section III—III of FIG. 1, the conduits being shown.
Figure 4:
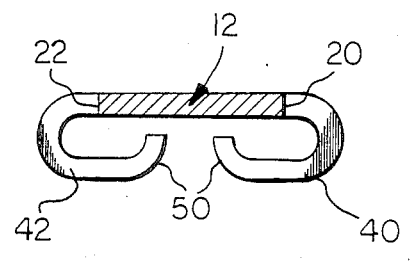
FIG. 4 is an elevational, sectional view as taken along Section IV—IV of FIG. 1, the clamped conduits not being shown for clarity of illustration.

As shown in FIGS. 1 and 3, the conduits being clamped include an outer flared conduit 54 telescopingly received over an inner flared conduit 56. The conduits 54 and 56 are formed of metal and may comprise a connection in the exhaust system of an internal combustion engine. The conduit 54 includes the flare 58 and the conduit 56 includes the double flare 60 and 62, and, as assembled, the flare 58 will sealingly engage the flare 62.

The contractible coupling in accord with the invention is "opened" by engaging the tabs 28, and in particular, the outermost end portions 32, with a plier-like implement, not shown, and the tabs are squeezed or pulled toward each other. This force will increase the diameter of the coupling and permit the coupling to be located about and embrace the flares 58-62. Thereupon, the tabs are released and the resiliency of the coupling as produced by the material of the body 12 will cause the coupling to contract toward its normal diameter and engage the finger arcuate portions 50 with the flares 58 and 60 as shown in FIG. 3.

As the diameter of the conduits' flares will not permit the coupling to contract to its normal diameter the finger portions 50 will firmly engage the flares 58 and 60 and impose both radial and axial forces on the flares forcing the flares 58 and 62 into tight engagement to produce the sealed connection desired between the conduits 54 and 56. As the only engagement between the coupling and conduits 54 and 56 occurs at the finger portions 50, the conduit flares 58 and 60 will be engaged at opposed spaced circumferential locations as determined by transversely aligned fingers 40 and 42, and as the finger portions 48 are in a spaced relationship to the body 12 and surface 26, the body will be radially spaced from the outer diameter of the conduits as apparent from FIG. 3. This spacing of the body 12 from the conduits prevents the body from being directly exposed to the temperature of the conduits, and the radial spacing also permits air to circulate between the conduit and body which will tend to cool the body. Also, it is to be understood that the inherent resiliency of the fingers 40 and 42 will tend to equalize the force imposed on the flares 58 and 60 by the convex portions 50, and properly locate the coupling relative to the flares, to produce a uniform and effective seal between the conduit flares.

It is appreciated that various modifications to the inventive concepts may be apparent to those skilled in the art without departing from the spirit and scope of the invention.

I claim:

1. The method of forming an annular radially contractible coupling from flat sheet metal comprising the steps of:
    (a) forming a flat sheet metal blank having a substantially rectangular body of elongated configuration having a longitudinal axis, an inner surface, an outer surface, ends and first and second lateral edges, an elongated tab extending from each body end in the direction of the length of the body, the tab at one body end being located on the opposite side of the body axis than the tab at the other body end, first and second sets of elongated fingers extending from the body first and second lateral edges, respectively, the fingers of a common set having free ends, being substantially perpendicular to the body length, and spaced relative to each other along the associated body edge, each finger of each set being in opposed transverse alignment with a finger of the other set,
    (b) bending the fingers in a direction substantially perpendicular to the body axis whereby the fingers overlie the body inner surface and the fingers' free ends extend toward the body axis and bending the fingers' free ends toward the body inner surface to form spaced transversely opposed convex portions adjacent the fingers' free ends, and
    (c) forming the body into an annular band configuration in the direction of the body axis whereby the formed fingers defined the coupling normal inner diameter and the tabs are disposed adjacent each other and define handles to permit opening of the coupling.

2. In the method of forming a coupling as in claim 1, wherein the step of bending the fingers in a direction substantially perpendicular to the body axis locates the fingers in spaced relationship to the body inner surface.

3. In the method of forming a coupling as in claim 2, wherein the step of bending the fingers in a direction substantially perpendicular to the body axis locates a portion of the fingers in spaced parallel relation to the body inner surface.

4. In the method of forming a coupling as in claim 1, including the step of heat treating the body after forming the body into an annular configuration to increase the resistance of the metal of the body to deformation.

5. A radially contractible reusable coupling comprising, in combination, an annular body of resilient sheet metal having first and second ends, first and second lateral edges, an inner surface, an outer surface and a central longitudinal axis, a plurality of deformed fingers having free ends homogeneously defined on said body extending from said lateral edges and deformed approximately 180° toward said body axis and radially spaced from said body inner surface, said free ends being deformed toward said body inner surface and defining a covex arcuate clamping surface defined on each finger adjacent said free end thereof adapted to engage the members being coupled, said fingers on a common lateral body edge being spaced from each other and defining the coupling inside diameter, and body expansion means defined on said body's ends.

6. In a radially contractible coupling as in claim 5, each of said fingers including a base portion adjacent the associated body lateral edge, a free end and an intermediate portion between said base portion and said free end, said base portion comprising an approximate 180° bend and said intermediate portion being substantially parallel to and spaced from said body inner surface.

7. In a radially contractible coupling as in claim 6, said fingers' free ends being located over said body's inner surface a distance less than one half of said body's width as defined by said body's lateral edges.

8. In a radially contractible coupling as in claim 7, said fingers extending from said body's first lateral edge each being transversely aligned with a finger extending from said body's second lateral edge with respect to said body axis.

9. In a radially contractible coupling as in claim 5, said fingers' deformed free ends being located over said body's inner surface a distance less than one half of said body's width as defined by said body's lateral edges.

10. A radially contractible coupling comprising, in combination, an annular body of resilient sheet metal having first and second ends, first and second lateral edges, an inner surface, an outer surface and a central longitudinal axis, a plurality of deformed fingers having free ends homogeneously defined on said body extending from said lateral edges and deformed approximately 180° toward said body axis and radially spaced from said body inner surface, a convex arcuate surface defined on each finger adjacent said free end thereof, said fingers on a common lateral edge being spaced from each other and defining the coupling inside diameter, and body expansion means defined on said body's ends, said body expansion means comprising a tab homogeneously defined on each end of said body extending outwardly from the annular configuration of said body and disposed adjacent each other and extending past each other in the body circumferential direction whereby squeezing said tabs toward each other increases the inside diameter of said coupling, the tab defined on said body first end being on the opposite side of said body longitudinal axis than said tab defined on said body second end.

11. In a radially contractible coupling as in claim 10, each of said tabs including an outer lateral edge, an elongated flange defined upon said tab's outer lateral edge deformed inwardly to strengthen said tabs against bending forces.

* * * * *